US008723947B2

(12) United States Patent
Niedermeier et al.

(10) Patent No.: US 8,723,947 B2
(45) Date of Patent: May 13, 2014

(54) APPARATUS AND METHOD FOR ALIGNING CONTAINERS, IN PARTICULAR BOTTLES, IN A LABELER

(75) Inventors: Anton Niedermeier, Offenstetten (DE); Karl Aichinger, Metten (DE)

(73) Assignee: Krones AG, Neutraubling (DE)

( * ) Notice: Subject to any disclaimer, the term of this patent is extended or adjusted under 35 U.S.C. 154(b) by 623 days.

(21) Appl. No.: 12/767,033

(22) Filed: Apr. 26, 2010

(65) Prior Publication Data

US 2010/0289890 A1 Nov. 18, 2010

(30) Foreign Application Priority Data

May 12, 2009 (DE) ......................... 10 2009 020 921

(51) Int. Cl.
*H04N 7/18* (2006.01)

(52) U.S. Cl.
USPC .................................. 348/95; 348/94; 348/92

(58) Field of Classification Search
USPC .................................................... 348/128, 86
See application file for complete search history.

(56) References Cited

U.S. PATENT DOCUMENTS 3,301,396 A * 1/1967 Benson et al. ................ 209/530
3,403,392 A * 9/1968 Wogatzke ....................... 341/13
4,722,295 A * 2/1988 Young ........................... 118/416
4,829,248 A * 5/1989 Loubier ..................... 324/207.2
5,013,905 A * 5/1991 Neri .......................... 250/223 R
5,073,708 A * 12/1991 Matsumoto et al. ...... 250/223 B
5,247,253 A * 9/1993 Bowman .................. 324/207.12
5,287,524 A * 2/1994 Rizzoli et al. .................... 348/86
5,478,422 A * 12/1995 Bright et al. ..................... 156/64
5,591,462 A * 1/1997 Darling et al. ................ 425/173
5,633,676 A * 5/1997 Harley et al. ................... 348/95
6,181,372 B1 * 1/2001 Neri et al. ..................... 348/128
6,428,639 B1 * 8/2002 Oldenburg et al. ............. 156/64
6,532,831 B2 * 3/2003 Jin et al. .................... 73/862.331
6,639,206 B1 * 10/2003 Rothamel et al. ........ 250/231.13
7,331,152 B2 * 2/2008 Menke .............................. 53/67
7,478,660 B2 * 1/2009 Sernesi et al. ................ 156/362
7,679,758 B2 * 3/2010 Wei et al. ...................... 356/625
7,685,797 B2 * 3/2010 Zwilling ......................... 53/544
(Continued)

FOREIGN PATENT DOCUMENTS

DE 102004026755 A1 12/2005
EP 1205388 A1 5/2002
(Continued)

OTHER PUBLICATIONS

Weibo et al. "Some considerations of eddy current proximity sensor applied for motor speed measurement". Oct. 2008. International Conference on Electrical Machines and Systems, 2008. ICEMS 2008. p. 963-967.*

(Continued)

*Primary Examiner* — Sath V Perungavoor
*Assistant Examiner* — Matthew J Anderson
(74) *Attorney, Agent, or Firm* — Marshall, Gerstein & Borun LLP

(57) ABSTRACT

An apparatus and a method for aligning containers, in particular bottles, in a labeler, the apparatus having rotatable holders for containers to be aligned, and a camera unit for imaging the containers as well as a proximity switch for triggering an imaging function of the camera unit. This allows a precise alignment in combination with a reduced expenditure of time and reduced space requirements.

12 Claims, 3 Drawing Sheets

(56) References Cited

U.S. PATENT DOCUMENTS

| | | | | |
|---|---|---|---|---|
| 7,856,726 | B2 * | 12/2010 | Davidson | 33/1 PT |
| 7,997,201 | B2 * | 8/2011 | Till | 101/485 |
| 8,067,722 | B2 * | 11/2011 | Akkerman et al. | 250/223 B |
| 8,149,520 | B2 * | 4/2012 | Kurosawa | 359/698 |
| 8,477,185 | B2 * | 7/2013 | Secchi et al. | 348/86 |
| 2006/0037706 | A1 * | 2/2006 | Putzer | 156/360 |
| 2008/0134633 | A1 | 6/2008 | Zwilling | |
| 2010/0071830 | A1 * | 3/2010 | Putzer | 156/64 |
| 2011/0140010 | A1 * | 6/2011 | Akkerman et al. | 250/553 |

FOREIGN PATENT DOCUMENTS

| | | | |
|---|---|---|---|
| EP | 1205388 | A1 * | 5/2002 |
| EP | 1597564 | A1 | 11/2005 |
| JP | 2004-250104 | A | 9/2004 |
| WO | WO-2004088295 | A1 | 10/2004 |
| WO | WO-2007042673 | A1 | 4/2007 |
| WO | WO-2009072157 | A1 | 6/2009 |

OTHER PUBLICATIONS

Japanese Office Action for Patent Application No. P2010-101009 mailed May 22, 2012.

German Search Report for 10 2009 020 921.2 mailed Feb. 4, 2010.

* cited by examiner

APPARATUS AND METHOD FOR ALIGNING CONTAINERS, IN PARTICULAR BOTTLES, IN A LABELER

CROSS-REFERENCE TO RELATED APPLICATION

The present application claims the benefit of priority of German Patent Application No. 102009020921.2, filed May 12, 2009. The entire text of the priority application is incorporated herein by reference in its entirety.

FIELD OF THE DISCLOSURE

The disclosure relates to an apparatus and a method for aligning containers, such as bottles in a labeling machine, such as used in beverage bottling operations.

BACKGROUND

When bottles are treated in filling lines, and in particular when labels are attached to containers in labelers, it is often necessary to align the rotary positions of the containers so as to guarantee that there is a sufficiently large distance e.g. between a burr and the label and/or that the label is correctly positioned with respect to a glass embossment.

In this respect, it is known from EP 1 205 388 B2 to record, by means of four cameras, the outer surface of a container over the whole circumference thereof, to evaluate suitable features in the recorded images and to transmit to the drive system instructions for rotating the container about its longitudinal axis to a desired position.

In apparatuses of this kind the container is rotated at a constant angular speed which has to be observed as precisely as possible when the features are being recorded. In addition, the containers to be aligned must be moved past the cameras at a constant speed, so that the rotary position of the containers and their position in the machine, e.g. the angular position of a conveying carousel in the machine, can be allocated precisely.

In view of inaccuracies (backlash, synchronized speed variations or the like) in the interaction between the drive systems, which rotate the container and move it past the cameras, and the trigger times at which the pictures are taken, the accuracy of the above described method is often insufficient so that a subsequent fine adjustment of the containers with the aid of a separate camera becomes necessary. To this end, additional machine positions have to be provided in the machine.

It is an aspect of the present disclosure to provide an apparatus and a method for exactly aligning the rotary position of the containers with little expenditure of time and little space requirement.

This aspect is achieved by a proximity switch for triggering an imaging function of the camera unit. This makes the triggering of individual camera images independent of synchronized speed variations. Since this increases the accuracy of image evaluation, the rotary position of the container can be corrected in one step, i.e. also without any fine adjustment. In addition, acceleration and/or deceleration ramps of the rotation of the container can be included in the recording of the feature, and the space required in the machine for this purpose can be utilized.

The proximity switch preferably comprises a plurality of trigger signal generators provided on the holder at predetermined rotary angle intervals and a stationary receiving unit including at least one trigger signal receiver. It is thus possible to generate trigger signals which depend primarily on the angle positions of the trigger signal generators. This allows a particularly precise determination of the rotary position and of the alignment of the container.

According to an advantageous embodiment, at least every third trigger signal generator is positioned opposite the trigger signal receiver, when it is at a rotary position at which it is located at a minimum distance from the receiving unit. This allows reliable triggering.

Preferably, the apparatus additionally comprises a conveying means which moves the holder along a reception area of the trigger signal receiver. It is thus possible to align a continuous flow of containers.

A plurality of trigger signal receivers is, in an advantageous manner, arranged in the receiving unit such that the conveying means moves the holder along the reception areas of the trigger signal receivers in succession. It is thus possible to trigger a plurality of cameras independently of one another.

According to a preferred embodiment, the trigger signal receivers are distributed over at least two planes which extend substantially parallel to the conveying direction of the conveying means. This allows an overlapping mode of arrangement of the trigger signal receivers.

The receiving unit comprises, in an advantageous manner, a plurality of trigger signal receivers, and the distances between neighboring trigger signal receivers are adapted to the profile of an acceleration and/or deceleration ramp of the rotary movement of the holder. It is thus possible to include acceleration and/or deceleration ramps in the recording of the feature and to provide the apparatus with a particularly compact structural design.

According to a particularly advantageous embodiment, the proximity switch is sensitive to magnetic fields. Magnetic proximity switches are particularly insensitive to soiling.

According to a preferred embodiment, the apparatus further comprises a computing unit for localizing a feature on the imaged container and for computing an actual rotary position of the container, and a control unit for effecting a movement to a desired rotary position of the container. It is thus possible to bring the container to a rotary position suitable for labeling.

The technical problem is additionally solved by a method in the case of which a proximity switch triggers the imaging of the container. This makes the triggering of individual camera images independent of synchronized speed variations. Since this increases the accuracy of image evaluation, the rotary position of the container can be corrected in one step, i.e. without any fine adjustment. In addition, acceleration and/or deceleration ramps of the rotation of the container can be included in the recording of the feature, and the space required in the machine for this purpose can be utilized.

According to a preferred embodiment, trigger signal generators rotate together with the container and at least every third trigger signal generator produces a trigger signal when it approaches a stationary receiving unit. This allows a reliable triggering, which is independent of synchronized speed variations.

A particularly advantageous embodiment is so conceived that, at a rotary position of the trigger signal generators at which the respective trigger signal generators are located at a minimum distance from the receiving unit, the trigger signal reaches a predetermined trigger level so that a trigger control signal is outputted, which triggers the imaging of the container.

A preferred embodiment is so conceived that, while the developed view of the container is being formed, the container is moved along at least one reception area of the receiving unit. It is thus possible to align a continuous flow of containers.

According to an advantageous embodiment, the trigger signal is generated in different trigger signal receivers of the receiving unit. It is thus possible to trigger a plurality of cameras independently of one another.

According to a preferred embodiment, the method further comprises the following steps: localizing a feature on the imaged container and computing an actual rotary position of the container; and effecting a movement to a desired rotary position of the container. The container can thus be brought to a rotary position which is suitable for labeling.

BRIEF DESCRIPTION OF THE DRAWINGS

A preferred embodiment of the disclosure is shown in the drawing and explained herein below.

DETAILED DESCRIPTION OF THE PREFERRED EMBODIMENT

Figure 1:
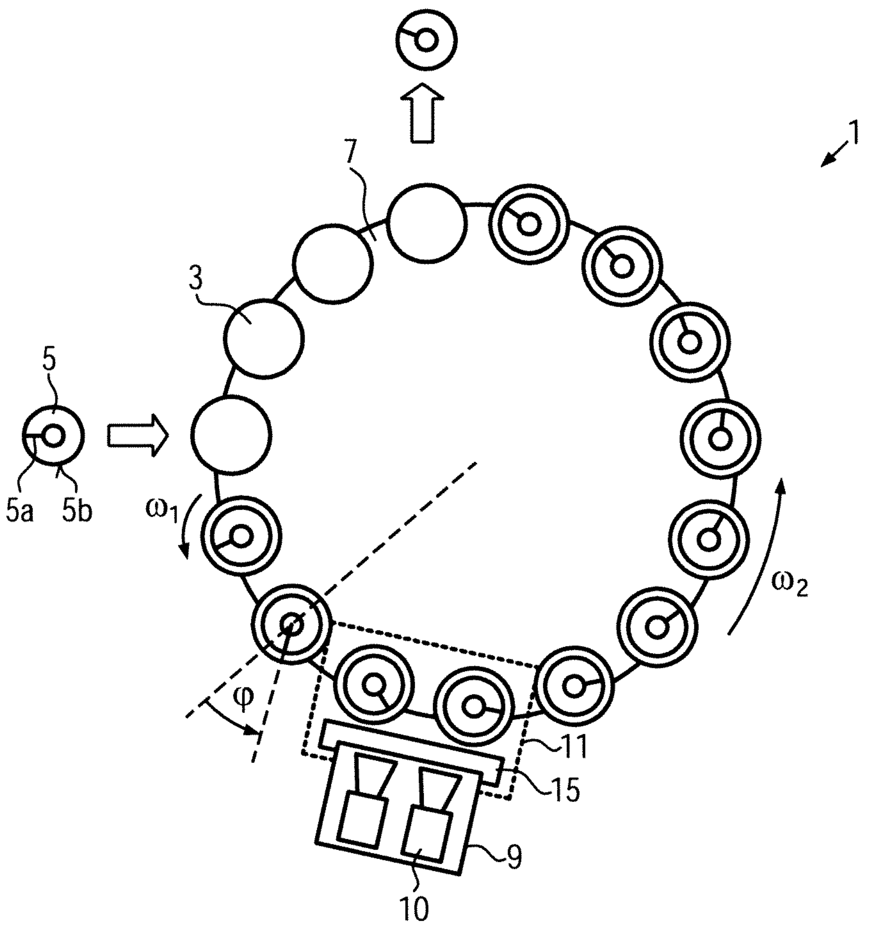
FIG. 1 shows a schematic top view of an apparatus for aligning the rotary position of containers according to the present disclosure.
Figure 2:
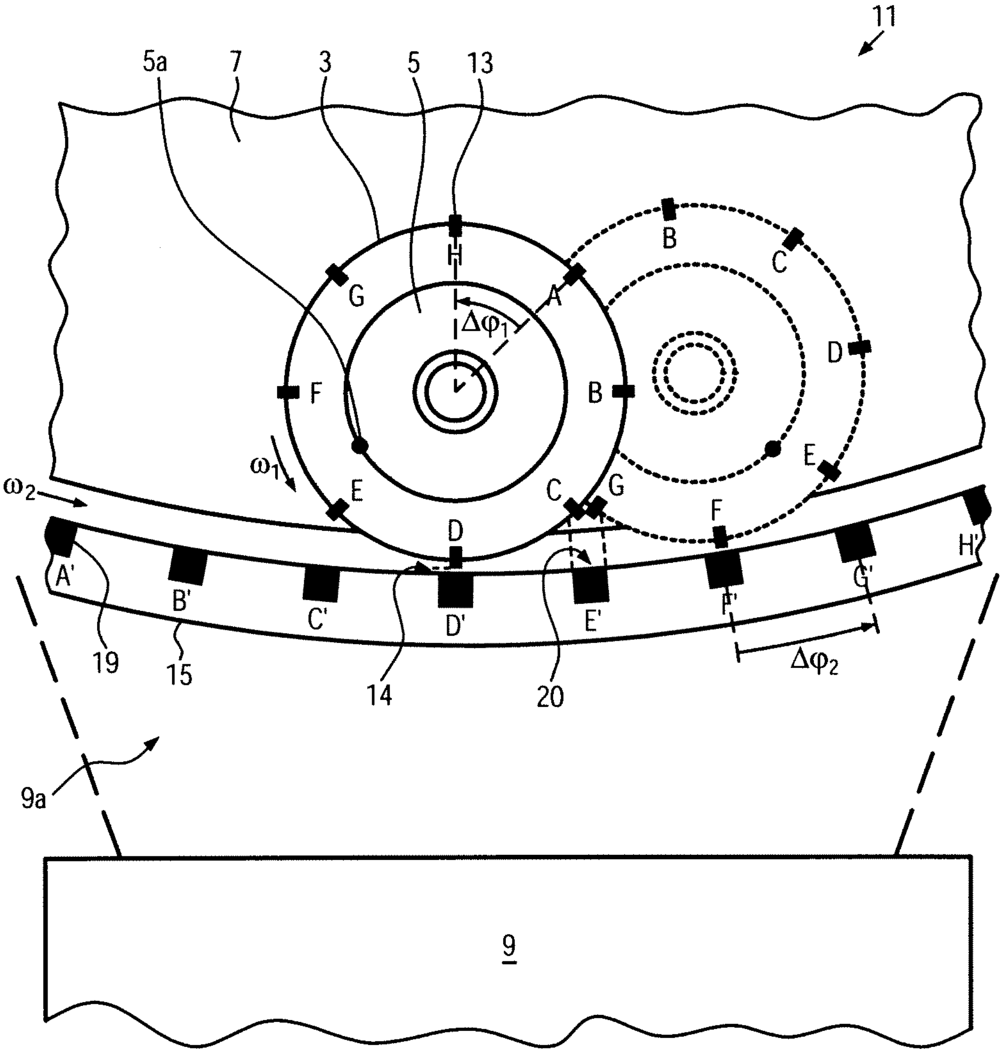
FIG. 2 shows a detailed schematic view of the proximity switch according to FIG. 1.

According to FIGS. 1 and 2, the apparatus 1, which may e.g. be a labeler, comprises a plurality of rotatable holders 3, e.g. motor-driven turntables with a centering device, for containers 5, in particular bottles, which are to be aligned with respect to their rotary positions $\phi$ by rotation about their main axis. The holders 3 circulate on a conveying means 7, such as a conveying carousel.

The apparatus additionally comprises a stationary camera unit 9 including an arbitrary number of cameras 10 for recording a feature 5*a* of the container 5, e.g. a burr or an embossment. To this end, the conveying means 7 conveys the container 5 through the image area 9*a* of the camera unit 9, while the holder 3 causes a developed view of the peripheral surface 5*b* of the container 5 to be formed in front of the camera unit 9. The image area 9*a* may be composed of overlapping image areas of the cameras 10.

The acquisition of image data, e.g. the recording of a partial view of the surface 5*b* to be developed, is triggered by a proximity switch 11 at respective predetermined rotary positions $\phi$. In the example shown, a picture of the container 5 is taken whenever the holder 3 has been advanced by a rotary angle interval $\Delta\phi_1$. To this end, trigger signal generators 13, e.g. magnets, are arranged on the holder 3 at the regular rotary angle intervals $\Delta\phi_1$, which, when they approach a stationary receiving unit 15, generate a respective trigger signal T in the latter. When the trigger signal T reaches a predetermined trigger level P, the receiving unit 15 transmits a trigger control signal S to the camera unit 9 so that an image of the container 5 will be recorded. The apparatus 1 additionally comprises a computing unit 17 for storing and further processing the image data.

The receiving unit 15 preferably comprises individual trigger signal receivers 19, e.g. Hall sensors, which are arranged one after the other when seen in the conveying direction of the conveying means 7, and it preferably covers the whole image area 9*a* of the camera unit 9.

FIG. 2 illustrates the mode of operation of the proximity switch 11 on the basis of two positions of a holder 3 passed through the image area 9*a*; neighboring holders 3 have been omitted for the sake of clarity. The holder 3 rotates at the angular speed $\omega$1 and the conveying means 7 rotates at the angular speed $\omega$2.

Trigger signal generators 13 are uniformly distributed on the circumference of the holder 3 at the positions A-H, the respective rotary angle interval $\Delta\phi_1$ being 45° in the present example. Other rotary angle intervals $\Delta\phi_1$ may, however, be used as well. Also the trigger signal receivers 19 are distributed uniformly over the receiving unit 15 at the positions A'-H', the distance between said trigger signal receivers 19 being defined by the angle interval $\Delta\phi_2$.

The angle intervals $\Delta\phi_1$ and $\Delta\phi_2$ as well as the angular speeds $\omega$1 and $\omega$2 are adapted such that, at a position at which the trigger signal generators 13 are located at a minimum distance 14 from the receiving unit 15, said trigger signal generators 13 come to lie in opposed relationship with a trigger signal receiver 19 at a location within the reception area 20 covered by the trigger signal receiver 19, so that the trigger level P will be reached or exceeded when the trigger signal generator 13 and the trigger signal receiver 19 are disposed in opposed relationship. In the example shown, position D lies opposite position D' at the moment of triggering and position F lies opposite F' (indicated by a broken line). Accordingly, E would be located opposite E' at the moment of triggering, G opposite G', etc. (not shown).

According to FIG. 2, the number of trigger signal generators 13 and trigger signal receivers 19 is identical so that successive trigger control signals S are generated in neighboring trigger signal receivers 19. It follows that the number of trigger signal generators 13 preferably corresponds to the number of camera images required per developed view of a container. However, the receiving unit 15 may also comprise a number of trigger signal receivers 19 that is smaller than the number of trigger signal generators 13 provided on the holder 3.

For example, a trigger signal receiver 19 may be provided only at every second or third position A'-H', so that only every second or third trigger signal generator 13 will trigger a trigger control signal S when it approaches the receiving unit 15. If the number of trigger control signals S required should nevertheless be higher than the number of trigger signal receivers 19 provided, "missing" triggering moments could be calculated from the time intervals between the trigger control signals S triggered previously by the trigger signal generators 13. It goes without saying that such calculations, e.g. interpolations, are also possible when the number of trigger signal generators 13 is identical with the number of trigger signal receivers 19. This allows the taking of additional camera images at intermediate positions within the rotary angle interval $\Delta\phi_1$.

Figure 3:
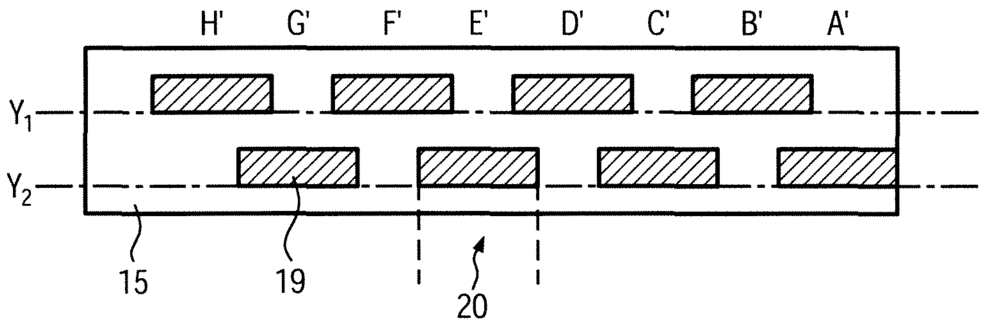
FIG. 3 shows a schematic side view of a receiving unit.

The size of the reception area 20 in the conveying direction of the conveying means 7 is so large that the synchronized speed variations, which are nothing out of the common in labelers, especially with respect to the angular speeds $\omega$1 and $\omega$2, cannot have the effect that a trigger signal generator 13 is, by mistake, not brought into registry with the associated trigger signal receiver 19 and does therefore not generate a trigger control signal S. To this end, the trigger signal receivers 19 can be arranged such that the reception areas 20 of neighboring trigger signal receivers 19 overlap. The trigger signal generators 13 and the trigger signal receivers 19 are then distributed over at least two planes $Y_1$, $Y_2$ extending substantially parallel to the conveying direction of the conveying means 7. In FIG. 3, this is indicated schematically for the receiving unit 15. Such a distribution over a plurality of planes $Y_1$, $Y_2$ may, however, also become necessary, when the diameter of the holder 3 is not large enough for arranging the necessary number of trigger signal generators 13 at a sufficient distance from one another.

The proximity switch 11 is preferably based on a magnetic operating principle, i.e. it responds to a magnetic field acting thereon, so as to guarantee that the apparatus will operate without being sensitive to soiling. However, also other contactless operating units for position detection, such as light barriers, are imaginable as proximity switch 11. In this case, the trigger signal generators 13 may be implemented as reflecting or backscattering surfaces.

The trigger signal generators 13 can be arranged at an arbitrary location of the holder 3 allowing a resolution of the rotary position $\phi$, e.g. on the lower surface of said holder 3, alternatively also on a drive unit of the holder 3, e.g. on a motor and/or a shaft (not shown).

The receiving unit 15 can comprise arbitrary trigger signal receivers 19 which are sensitive to magnetic fields. The number of these trigger signal receivers 19 corresponds preferably at least to the number of camera images required for recording the feature 5*a* or to the number of partial views required for a complete developed view of the container 5.

The angular speed $\omega 1$ need not be constant throughout the whole developed view of the surface 5*b*. Acceleration and deceleration ramps of the rotary movement of the holder 3 may e.g. be included in the recording of feature 5. Other than in the example shown, the distance or the angle interval $\Delta\phi_2$, must then be adapted to the respective change in the angular speed $\omega_1$. It follows that the angle interval $\Delta\phi_2$ would be larger in the case of a substantially constant angular speed $\omega_2$ of the conveying means 7 during an acceleration and/or deceleration ramp of the holder 3 than in the case of a nominal value or maximum value of the angular speed $\omega_1$.

The conveying means 7 is not limited to a conveying carousel, but may also be linear in shape and/or curved, and it may consist e.g. of a conveyor belt. The arrangement of the trigger signal receivers 19 should then be adapted in a suitable manner to the changed shape of the conveying means 7 in the image area 9*a*. Also the angle interval $\Delta\phi_2$ would then be replaced, if necessary, by a comparable linear parameter.

The computing unit 17 computes an actual rotary position of the container 5. In order to be able to effect a movement to a desired rotary position, the apparatus 1 additionally comprises a control unit 21 which generates suitable control signals and transmits them to the drive units of the holders 3, e.g. the servo motors.

The above-described variations of the embodiment shown in the drawings can be combined in an arbitrary manner.

The apparatus according to the present invention can be used as follows:

A continuous flow of containers 5 to be aligned, which are each retained on the rotating holders 3 in a centered manner, is supplied from the conveying means 7 to the proximity switch 11. As soon as a trigger signal generator 13 approaches the receiving unit 15 to such an extent that the trigger level P in said receiving unit is reached or exceeded, the receiving unit 15 will transmit to the camera unit 9 a trigger control signal S for taking a camera picture. In the meantime, both the conveying means 7 and the holder 3 continue to rotate. As soon as the next trigger signal generator 13 approaches the receiving unit 15 to a sufficient extent, a further trigger control signal S will be transmitted to the camera unit 9. The acquisition of measurement data is continued in this way until a developed view of the whole peripheral surface of the container 5 has been formed. A plurality of containers can be present in the measurement area 9*a* simultaneously, the respective containers being recorded by different cameras 10.

The image data are then evaluated, feature 5*a* is localized, an actual position of the rotary position $\phi$ of the container 5 is calculated and suitable control signals are transmitted to the holders 3 so as to establish a desired position of the rotary position $\phi$ of the containers.

The present invention offers the general advantage that the triggering moments, and consequently the taking of camera pictures, only depend on the rotary angle positions $\phi$ of the trigger signal generators 13 and are therefore independent of the synchronized speed variations of the conveying means 7 and of the holders 3 which often occur in labelers. The temporal correlation between data acquisition and position determination is here very precise and is typically about 100 μs. Due to the enhanced accuracy of alignment, subsequent labeling can be executed also without any additional fine adjustment of the container 5. The apparatus 1, e.g. a labeler with container alignment, can therefore be provided with a more compact overall structural design.

In addition, it is no longer necessary to accelerate the holder 3 to a nominal speed prior to recording the feature 5*a*, nor is it necessary to maintain said nominal speed precisely while said feature 5*a* is being recorded. On the contrary, acceleration and deceleration ramps can be included in the development of the peripheral surface of the container. In this case, it will only be necessary to arrange the positions of the trigger signal receivers 19 at suitable, different distances $\Delta\phi_2$. This allows an even more compact structural design of the apparatus 1.

The development of the container 5 is independent of the performance of the machine. If the labeler operates slower than rated, the velocity with which the developed view of the container surface 5*b* is formed will be reduced accordingly.

The invention claimed is:

1. An apparatus for aligning the rotary position ($\phi$) of containers, in particular bottles, in a labeler, comprising:
- a plurality of rotatable holders, each holder accommodating a container to be aligned;
- a stationary camera unit for forming an image of the container; and
- a proximity switch for triggering an imaging function of the camera unit, wherein the proximity switch comprises a plurality of trigger signal generators provided on each of the holders at predetermined rotary angle intervals ($\Delta\phi_1$) and a stationary receiving unit including at least one trigger signal receiver,
- wherein the apparatus additionally comprises a rotatable conveying means which moves the holder along a reception area of the trigger signal receiver.

2. An apparatus according to claim 1, wherein at least every third trigger signal generator is positioned opposite the trigger signal receiver, when it is at a rotary position ($\Phi$) at which it is located at a minimum distance from the receiving unit.

3. An apparatus according to claim 1, wherein a plurality of trigger signal receivers is arranged in the receiving unit in such a way that the conveying means moves the holder along the reception areas of the trigger signal receivers in succession.

4. An apparatus according to claim 3, wherein the trigger signal receivers are distributed over at least two planes ($Y_1$, $Y_2$) which extend substantially parallel to the conveying direction of the conveying means.

5. An apparatus according to claim 1, wherein the receiving unit comprises a plurality of trigger signal receivers, and that the distances ($\Delta\Phi_2$) between neighboring trigger signal receivers are adapted to the profile of one of an acceleration ramp, a deceleration ramp, or a combination thereof of the rotary movement of the holder.

6. An apparatus according to claim 1, wherein the proximity switch is sensitive to magnetic fields.

7. An apparatus according to claim 1, and further comprising: a computing unit for localizing a feature on the imaged container and for computing an actual rotary position of the container; and a control unit for effecting a movement to a desired rotary position of the container.

8. A method of aligning the rotary position ($\Phi$) of containers, in particular bottles, in a labeler, comprising:

a) rotating the containers to be aligned, each of the containers accommodated in a rotatable holder, and forming developed views of the peripheral surfaces of the containers in the image area of a stationary camera unit;

b) forming images of the containers with the camera unit so as to record a features of the containers; and c) triggering the imaging of the containers via a proximity switch, wherein each of a plurality of trigger signal generators is provided on each of the holders at predetermined rotary angle intervals ($\Delta\Phi_1$) with respect to one another and, while the developed view of the container is being formed, moving the container along at least one reception area of a stationary receiving unit including at least one trigger signal receiver.

9. A method according to claim 8, and rotating a plurality of trigger signal generators together with each of the containers and producing via at least every third trigger signal generator trigger signal (S) when it approaches a stationary receiving unit.

10. A method according to claim 9, and wherein at a rotary position ($\Phi$) of the trigger signal generators at which the respective trigger signal generators are located at a minimum distance from the receiving unit, the trigger signal (S) reaches a predetermined trigger level (P) so that a trigger control signal (S) is outputted, which triggers the imaging of the respective container.

11. A method according to claim 9, and generating the trigger signal (S) in different trigger signal receivers of the receiving unit.

12. A method according to claim 9, and:

(d) localizing a feature on the imaged container and computing an actual rotary position of the container; and (e) effecting a movement to a desired rotary position of the container.

* * * * *